April 28, 1964 J. B. ALLEN 3,131,330

TERMINAL BOARD ASSEMBLY

Filed April 4, 1962 2 Sheets-Sheet 1

INVENTOR.
JAMES B. ALLEN

BY [signature]

[signature]

ATTYS.

April 28, 1964 J. B. ALLEN 3,131,330

TERMINAL BOARD ASSEMBLY

Filed April 4, 1962 2 Sheets-Sheet 2

INVENTOR.
JAMES B. ALLEN

BY D. L. Hodges
J. D. Miller
ATTYS.

United States Patent Office 3,131,330
Patented Apr. 28, 1964

3,131,330

TERMINAL BOARD ASSEMBLY

James B. Allen, 47–F Ridge Road, Greenbelt, Md.

Filed Apr. 4, 1962, Ser. No. 185,170
4 Claims. (Cl. 317—99)
(Granted under Title 35, U.S. Code (1952), sec. 266)

The invention described herein may be manufactured and used by or for the Government of the United States of America for governmental purposes without the payment of any royalties thereon or therefor.

The present invention relates generally to the switchboard art and more particularly to a terminal board which has several tiers of frames. Each frame on the terminal board is capable of being easily and quickly rotated to inspect or maintain the electrical equipment mounted thereon. It has been customary in switchboard art to provide a structure comprising a cabinet having top, bottom and side members, together normally with a rear member, the cabinet being provided with one or more front structures which cover at least a portion of the front cabinet. Generally these front panel structures are mounted so they may be rotated in some manner to clear the front of the cabinet for maintenance purposes. The interior of the cabinets were generally fitted with a series of frames lying in horizontal planes and mounted to be slidable and individually moved out of the cabinet in some manner. The vertical removal of the front panel thus provided a path for one or more of these frames so that the electrical or electronic apparatus mounted thereon was accessible for replacement, adjustment or repair at the front of the cabinet.

The present invention provides a new and novel concept in the terminal board art. This invention provides a terminal board which embraces all the advantages of similarly employed prior art devices but does not require removal of the front panels in order to maintain the electronic components mounted on the terminal board.

The present invention utilizes a plurality of equally spaced panels mounted on any section of the cabinet. Each of the panels is separated from the adjacent panel by at least four spacer posts or pillars, two of the posts being common to one edge on one side of the panel for securely locking the panel to the adjacent panel and the other two posts each being located on a second common parallel edge on the one side connecting the panel with the adjacent panel by a hinge on each post. In this manner, as will be more fully described herein, complete access to each panel is achieved for maintenance or repair as deemed necessary.

It is contemplated that the present invention will be useful in the terminal board art and is particularly directed to the structure for mounting electronic or electrical apparatus on the chassis or panels such that the accessibility to these components is greatly increased.

It is an object of the present invention to provide a new and improved chassis construction which will permit the installation within a given space of a much larger number of electronic components in a more efficient manner.

Another object is to provide a new and improved terminal board that may be permanently mounted on a chassis in such manner that both sides may be readily inspected or maintained without removing the terminal board from the chassis.

A further object is to provide a new and improved terminal board having a plurality of frames permanently located on a chassis in such manner that either side of any one of the frames may be inspected or maintained without removing that frame or the adjacent frames from the terminal board in the process.

Still another object is to provide a plurality of mutually spaced frames having a plurality of electronic devices mounted thereon that are capable of being mounted either in a vertical or horizontal position and yet provide quick and easy inspection of any one of the frames without physically removing the adjacent frames.

Further objects and the entire scope of the invention will become further apparent in the following detailed description and in the appended claims. The accompanying drawings display the general construction and operational principles of the invention; it is to be understood, however, that the drawings are furnished only by way of illustration and not in limitation thereof.

This invention provides a new and improved structure for mounting frame members on a particular chassis member in such a way that any frame member can be rotated to a position providing more ready access thereto. The frame members will provide a convenient work table with very high accessibility to all the components mounted thereon. While the invention will be described in connection with a cabinet structure, it will be understood by the skilled worker in the art that the principles of the invention are not limited to the chassis containing the frame members, nor are they limited to the exemplary cabinets, or to cabinets having chassis that are rotatable in a vertical or horizontal plane. The frame members hereinafter described may be used in connection with the construction of any cabinet structure which is arranged so as to provide some accessibility.

The above objects, and others which will be apparent to one skilled in the art upon reading the specification, are accomplished by the construction and arrangement of parts of which an exemplary embodiment will now be described. Reference is made to the accompanying drawings wherein.

Figures 1, 2, 4:
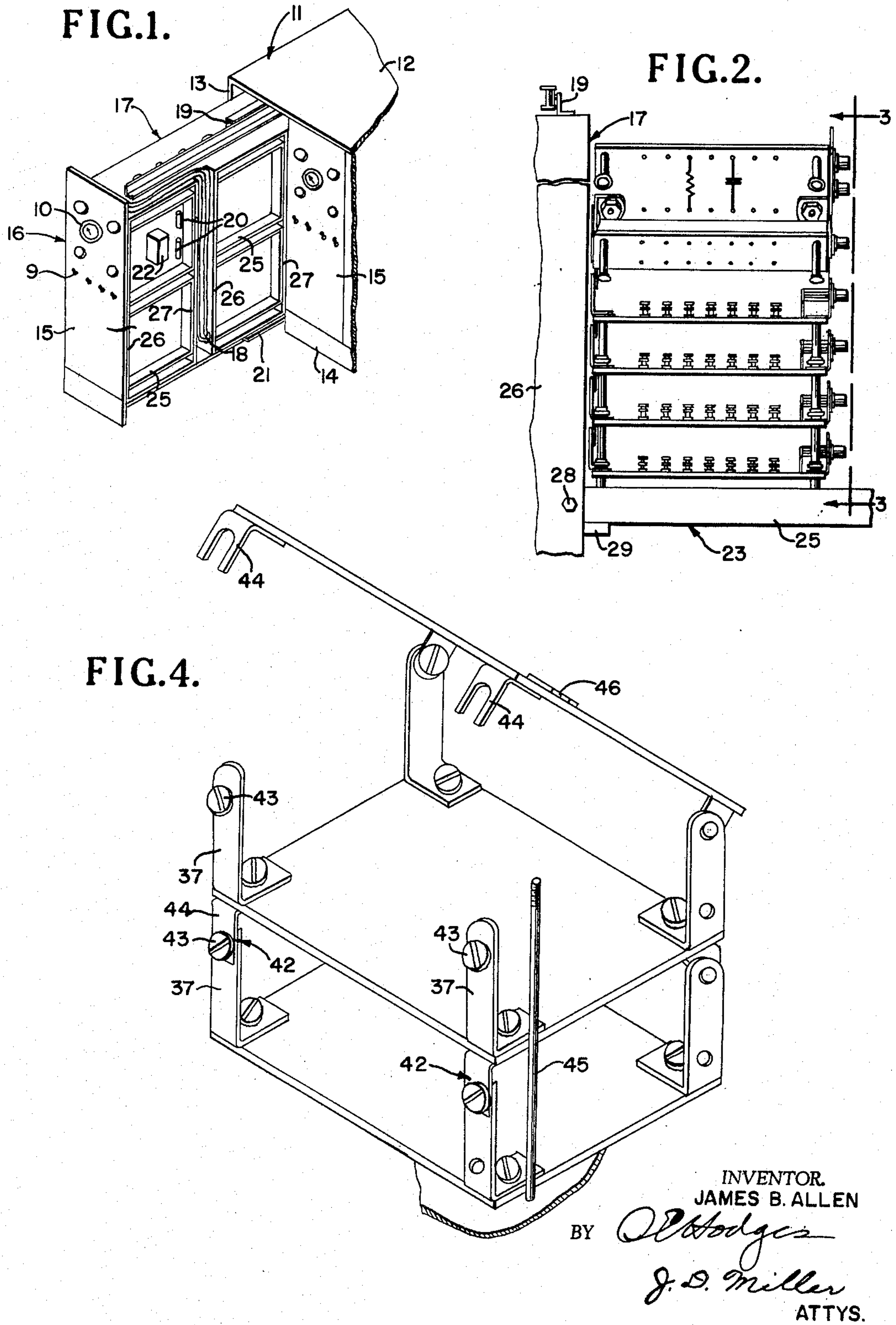
FIG. 1 is a perspective view of a chassis and cabinet front in accordance with a preferred embodiment of the invention mounted on the chassis unit.
FIG. 2 is a side elevational view of the terminal board shown in FIG. 1 with a subchassis rotated in a horizontal position and the top two frame members rotated to an open position.
FIG. 4 illustrates a modification of the terminal board as shown in FIG. 1.
Figure 3:
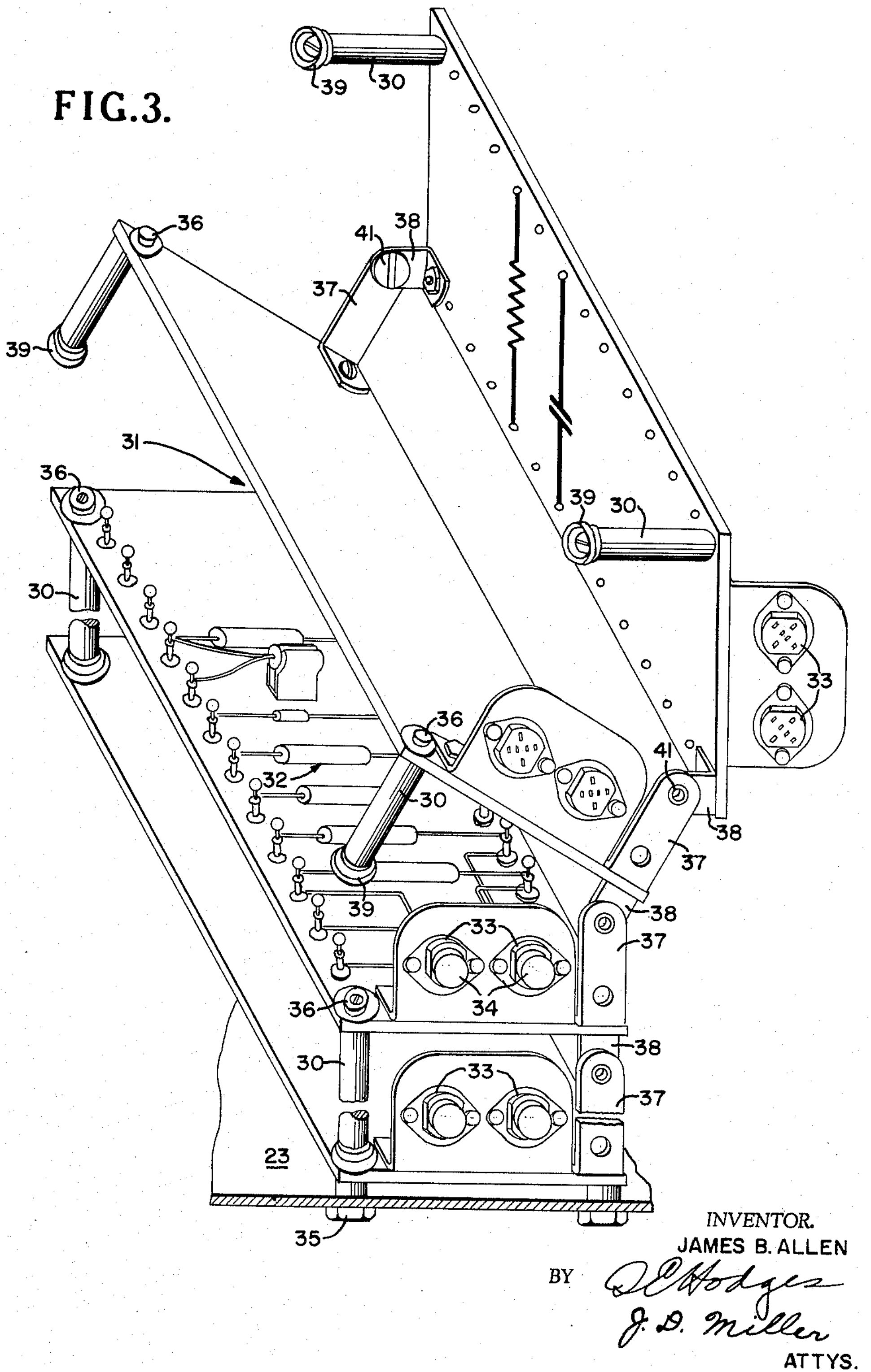
FIG. 3 is a section of the terminal board taken on line 3—3 of FIG. 2 looking in the direction of the arrows.

Referring now to the drawings, wherein like reference characters designate like parts throughout the several views, there is shown in FIG. 1 a cabinet 11 for electrical apparatus having a top 12, side members 13, a bottom 14 and a back (not shown). The cabinet has a plurality of front panel structures 15 attached to each chassis. In this particular embodiment, the panels 15 carry electronic apparatus 16 and more particularly controls which must be accessible to the operator of the apparatus. Such apparatus will include meters, switches, etc. The apparatus is connected to the components mounted on the front panels 15 by a flexible multi-lead cable 18. The chassis 17 are each mounted for forward and rear sliding movement by means of track elements 18 and 21. In FIG. 2 the chassis 17 is withdrawn and a subchassis 23 is rotated to a horizontal position. The chassis may either be a single member or comprise several submembers as shown in FIG. 1. The subchassis 23 as shown in FIG. 1 comprises a single sheet platform 25 which has side members 26 and 27 to provide stiffness thereto. Subchassis 23 are rotatably mounted on main chassis 17 by bolts 28. Flange 29 is located on the base of the subchassis 23 and stops the subchassis in a horizontal position when it is unlocked from the normal vertical position. FIG. 3 illustrates several tiers of mutually spaced frame members 31 which are mounted on a subchassis 23 by means which will hereinafter be more fully described. Also mounted on subchassis 23 is a transformer 22 and a pair of capacitors 20. These components are mounted in a manner well known in the art. The front control panel 15 has an ammeter 10 and control switches 9 mounted thereon. The particular control panel shown is made of an insulating material and is mounted on the vertical chassis unit. It is considered obvious that these components could be mounted by utilizing a horizontal chassis with a front panel in a rack-type structure in which there are a number of chassis and panels separated only by frames made from angle iron or I-beams. It is also considered obvious that the multiple frames 31 are not restricted to being mounted on the top portion of the chassis or subchassis but may be also mounted on the bottom side of the chassis or subchassis.

By placing all of the electrical components 32 on the various multiple frames it is now possible to package into one unit what may have been heretofore packaged in several units requiring several chassis and front control panels. It will be noted in FIG. 2 that a multiple of transistor base sockets 33 with transistors 34 therein are mounted on each of the frame members. The end space between the multiple tiers or frames is not sufficient to allow a person's hand to pass between frame members 31 in order to insert or remove any of the transistors. If the frame on which the transistors are located is unlocked and rotated to a horizontal position as shown in FIG. 2 of the drawing the transistors 34 located in sockets 33 become easily accessible for replacement or maintenance.

In operation, each frame 31 is mounted and spaced from the adjacent frame by spacers. The bottom frame is generally bolted to the frame with a spacer bolt 35 located at each corner of frame member 31. This spacer bolt allows wiring to be placed directly on the subchassis 23 and may be placed directly under the bottom frame if desired. As illustrated in FIG. 3 the top side of the bottom of the frame as viewed in the drawing has two male connectors 36 bolted or riveted on the two front corners thereof. The two back corners, as viewed on the drawing, have a pair of spacer legs 37 bolted in place such that the hinges 38 may be rotated together. The next adjacent frame carries a female connector 39 on the spacer post 30 on each of the bottom front corners which will mate with the male connectors 36 on the bottom frame. A male connector is located on each front corner on the top side of the second frame. The spacer post 30 and female connectors 39 on the second unit are located in such manner that the female connector will engage the male connector on the bottom frame to provide a locking relationship between the two frames. The second frame member at the rear corners thereof has one portion of the hinge member 38 bolted on the bottom thereof and on the top of the frame is located another leg spacer 37 in a substantially similar position as that of the first leg spacer. A bolt or rivet 41 connects the second leg spacer 37 with the hinge member 38 through the second frame member. Each of the adjacent frame members 31 is built in a similar manner, the number of tiers being limited only by the depth of the front panel or other space considerations. As shown in FIG. 3, each tier may be located in close proximity to the adjacent tier in an end-to-end relationship. However, the space between front and rear tiers requires slightly more space. The front and rear tiers may be placed in a closer relationship than as shown in FIG. 1, if required. If, in such an instance, the front tier required inspection or maintenance the rear tier would be unsnapped at the first or second frame and rotated to an open position thus providing additional room to inspect any frame in the front tier.

FIG. 4 discloses a slightly modified tier structure by providing another locking means 42 to each of the frame members of the tier. The spacer post 30 and female connector 39 have been replaced with a spacer leg 37 having a screw type fastener 43 which will engage a spade type member 44 on the second frame. It is anticipated that these frames may be locked in place and rotated for inspection and maintenance in substantially the same manner as the frames shown in FIG. 2. To facilitate shipping and rough handling a bolt 45 may be placed on the chassis in such manner that it will run parallel to the adjacent front ends of the tier making contact with a spade connector 46 located on the top frame of each tier, substantially as shown.

While the frames in the various tiers have been shown to be located on a chassis in a vertical relationship it is considered obvious that these units could be located on a chassis in a horizontal relationship. With the frame members located in the vertical position additional cooling is achieved due to the natural convection of hot air between the various frame members. While the preferred embodiments of this invention have been disclosed and shown in the drawings with components mounted thereon it is considered obvious that these components may be printed circuits located on each of the frame members, as is well known in the art.

By the use of the new and improved terminal board it is now possible to compact into a single unit electrical components that heretofore required several chassis to accommodate. However, this compaction of the electrical components has not resulted in time consuming maintenance or inspection because of the versatility of the new and improved terminal board which has been described herein.

Various modifications are contemplated and may obviously be resorted to by those skilled in the art without departing from the spirit and scope of the invention, as hereinafter defined by the appended claims.

What is claimed is:

1. An electrical apparatus comprising a housing, a chassis structure slidably mounted in said housing, at least one rotatable subchassis structure mounted in said chassis, means for pivoting the subchassis to a position normal to the chassis, a plurality of substantially flat frame members mounted on said subchassis in spaced, vertically stacked relation for housing a plurality of electrical components, means affixed to the upper and lower surfaces respectively of each of said plurality of frame members along one side thereof for pivotally interconnecting each frame member with an adjacent frame member, and means on each of said plurality of frame members along one other side only for spacing and normally locking each of the plurality of frame members with an adjacent frame member in parallel relationship therewith, said one other side being parallel to said one side having said pivotally interconnecting means affixed therealong, and said spacing and locking means being releasable on each of said plurality of frame members for unlocking for rotating each frame member to a position normal to the locked position to inspect the rotated frame member and to expose the adjacent frame member.

2. The electrical apparatus of claim 1 wherein the means on each of the frame members for spacing and normally locking each frame member to the adjacent frame members includes at least one spacer leg secured to each frame member, at least one spade connector secured to each frame member on the opposite surface thereof from the spacer leg, and locking nut means on each of said spacer legs for clamping each of said legs to the respective spade connector on the appropriate adjacent frame member.

3. The electrical apparatus of claim 1 wherein the means on each of the frame members for spacing and normally locking each frame member to the adjacent frame members includes at least one male connector secured to each frame member, at least one spacer leg secured to each frame member on the opposite surface thereof from the male connector, and a female connector affixed to each of said spacer legs for lockably receiving the respective male connector on the appropriate adjacent frame member.

4. An electrical apparatus comprising a housing, a chassis structure slidably mounted in said housing, at least one rotatable subchassis structure mounted in said chassis, means for pivoting the subchassis to a position normal to the chassis, a plurality of substantially flat frame members mounted on said subchassis in spaced vertically stacked relation for housing a plurality of electrical components, means affixed to the upper and lower surfaces respectively of each of said plurality of frame members along one side thereof for pivotally interconnecting each frame member with an adjacent frame member and so arranged that all of said pivotally interconnecting means be in substantially the same plane when said frame members are positioned in their normal spaced vertically stacked relation, means on each of said plurality of frame members along one other side only for spacing and normally locking each of the plurality of frame members with an adjacent frame member in parallel relationship therewith, said one other side being parallel to said one side having said pivotally interconnecting means affixed therealong, and said spacing and locking means being releasable on each of said plurality of frame members for unlocking and for rotating each frame member to a position normal to the locked position to inspect the rotated frame member and to expose the adjacent frame member.

References Cited in the file of this patent

UNITED STATES PATENTS

| | | |
|---|---|---|
| 2,740,097 | Edelman et al. | Mar. 27, 1956 |
| 2,994,807 | Devine et al. | Aug. 1, 1961 |